(12) United States Patent
Gordon

(10) Patent No.: US 11,794,951 B2
(45) Date of Patent: Oct. 24, 2023

(54) PALLET REPAIR SYSTEM AND METHODS FOR MANUFACTURE

(71) Applicant: Norman H. Gordon, Munster, IN (US)

(72) Inventor: Norman H. Gordon, Munster, IN (US)

( * ) Notice: Subject to any disclaimer, the term of this patent is extended or adjusted under 35 U.S.C. 154(b) by 62 days.

(21) Appl. No.: 17/602,274

(22) PCT Filed: Apr. 7, 2020

(86) PCT No.: PCT/US2020/027110
§ 371 (c)(1),
(2) Date: Oct. 7, 2021

(87) PCT Pub. No.: WO2020/210262
PCT Pub. Date: Oct. 15, 2020

(65) Prior Publication Data
US 2022/0161966 A1    May 26, 2022

Related U.S. Application Data

(60) Provisional application No. 62/830,514, filed on Apr. 7, 2019.

(51) Int. Cl.
*B65D 19/00* (2006.01)
*B29B 17/00* (2006.01)
(Continued)

(52) U.S. Cl.
CPC ...... *B65D 19/0073* (2013.01); *B29B 17/0042* (2013.01); *B29B 17/04* (2013.01);
(Continued)

(58) Field of Classification Search
CPC .... B65D 19/00; B65D 19/38; B65D 19/0073; B65D 19/06; B65D 2519/00273;
(Continued)

(56) References Cited

U.S. PATENT DOCUMENTS 3,384,229 A * 5/1968 Kaschyk ............... B65D 71/70
53/472
5,131,541 A * 7/1992 Liebel ............... B65D 71/0096
206/453

(Continued)

FOREIGN PATENT DOCUMENTS

WO    WO-2018146502 A1 * 8/2018 ......... B65D 19/0026

*Primary Examiner* — Jose V Chen
(74) *Attorney, Agent, or Firm* — Valauskas Corder LLC

(57) ABSTRACT

A pallet wrap system and manufacture for repair of wood pallets that extends the service life of wood pallets to reduce associated costs, environmental concerns, and workplace injuries. The wrap or wrap component comprises a plurality of portions hingedly attached to one another and configured to surround or cover a portion of a pallet. The wrap component may be manufactured using recycled material, such as paper, aluminum, or plastic, and may further include a chemical for properties such as elasticity, adhesion, and bonding grip. The wrap component may further be folded to such that it can be erected from a flattened state to form a display unit for products. The wrap may include printed information content such as advertising/marketing content, or manufacturer's or shipper's information, identification or logo to make sure that only that business' product is shipped or used with the identified pallet.

12 Claims, 12 Drawing Sheets

(51) Int. Cl.
  *B29B 17/04* (2006.01)
  *B65D 19/06* (2006.01)
  *B29L 31/00* (2006.01)

(52) U.S. Cl.
  CPC ........ *B65D 19/0095* (2013.01); *B65D 19/06* (2013.01); *B29B 2017/0015* (2013.01); *B29B 2017/0476* (2013.01); *B29L 2031/7158* (2013.01); *B65D 2203/00* (2013.01); *B65D 2519/00019* (2013.01); *B65D 2519/00024* (2013.01); *B65D 2519/00029* (2013.01); *B65D 2519/00034* (2013.01); *B65D 2519/00044* (2013.01); *B65D 2519/00064* (2013.01); *B65D 2519/0086* (2013.01); *B65D 2519/0092* (2013.01); *B65D 2519/00099* (2013.01); *B65D 2519/00159* (2013.01); *B65D 2519/00174* (2013.01); *B65D 2519/00273* (2013.01); *B65D 2519/00293* (2013.01); *B65D 2519/00323* (2013.01); *B65D 2519/00333* (2013.01); *B65D 2519/00373* (2013.01); *B65D 2519/00497* (2013.01); *B65D 2519/00507* (2013.01); *B65D 2519/00562* (2013.01); *B65D 2519/00572* (2013.01); *B65D 2519/00597* (2013.01); *B65D 2519/00651* (2013.01); *B65D 2519/00825* (2013.01)

(58) Field of Classification Search
  CPC ........... B65D 2519/00293; B65D 2519/00323; B65D 2519/00597; B65D 2519/00651; B65D 2519/00825; B65D 2519/0086; B65D 2519/0092
  USPC .......................................... 108/51.11–57.34
  See application file for complete search history.

(56) References Cited

U.S. PATENT DOCUMENTS

| | | | | |
|---|---|---|---|---|
| 5,139,145 A * | 8/1992 | Cook | ................ | B65D 71/04 206/386 |
| 5,213,050 A * | 5/1993 | Juvik-Woods | ......... | B65D 65/44 108/56.1 |
| 5,503,085 A * | 4/1996 | Rozek | ................ | B65D 19/0087 108/51.3 |
| 5,613,447 A * | 3/1997 | Trickett | ................ | B65D 19/36 206/596 |
| 5,794,542 A * | 8/1998 | Besaw | ................ | B65D 19/20 108/56.1 |
| 5,881,651 A * | 3/1999 | Trickett | ................ | B65D 19/36 108/51.11 |
| 5,894,804 A * | 4/1999 | Werner | ................ | B65D 19/38 108/53.5 |
| 6,024,223 A * | 2/2000 | Ritter | ................ | B65D 19/18 206/386 |
| 6,050,410 A * | 4/2000 | Quirion | ................ | B65D 19/20 229/117.02 |
| 6,079,560 A * | 6/2000 | Champion | ............ | B65D 19/20 206/386 |
| 6,192,807 B1 * | 2/2001 | Mason | ............... | B65D 19/0002 108/51.11 |
| 6,408,770 B1 * | 6/2002 | Mason | ................ | B65D 19/38 108/54.1 |
| D460,850 S * | 7/2002 | Giampavolo | ................ | D34/38 |
| 6,659,020 B1 * | 12/2003 | Ball | ................ | B32B 5/18 108/57.28 |
| 7,896,159 B2 * | 3/2011 | Goda | ................ | B65D 81/056 206/386 |
| 8,221,869 B2 * | 7/2012 | Pare | ................ | B65D 81/02 428/126 |
| 8,256,615 B2 * | 9/2012 | Goda | ................ | B65D 19/06 206/386 |
| 8,256,621 B2 * | 9/2012 | Deiger | ................ | B65D 71/10 206/600 |
| 8,397,916 B1 * | 3/2013 | Cassidy | ............. | B65D 19/0028 206/386 |
| 8,789,475 B1 * | 7/2014 | Giampavolo | .......... | B65D 19/38 108/54.1 |
| 9,016,212 B2 * | 4/2015 | Valiulis | ................ | G09F 23/06 229/87.01 |
| 2003/0010816 A1 * | 1/2003 | Jackson | ................ | B65D 5/003 229/174 |
| 2005/0274296 A1 * | 12/2005 | Dickner | ............. | B65D 71/0092 108/51.11 |
| 2006/0278691 A1 * | 12/2006 | Bezek | ................ | B65D 5/28 229/918 |
| 2008/0022905 A1 * | 1/2008 | Trickett | ................ | B65D 19/36 108/57.17 |
| 2009/0053033 A1 * | 2/2009 | Barbalho | ........... | B65D 19/0095 108/51.11 |
| 2010/0012000 A1 * | 1/2010 | Gordon | ................ | B65D 19/20 108/56.3 |
| 2011/0308993 A1 * | 12/2011 | Hill | ................ | B65D 19/20 493/122 |
| 2016/0023803 A1 * | 1/2016 | Green | ................ | B65D 19/0095 108/57.12 |
| 2016/0075471 A1 * | 3/2016 | Ranade | ............. | B65D 81/3816 206/386 |
| 2021/0070539 A1 * | 3/2021 | Chasteen | ............. | B65D 90/028 |

* cited by examiner

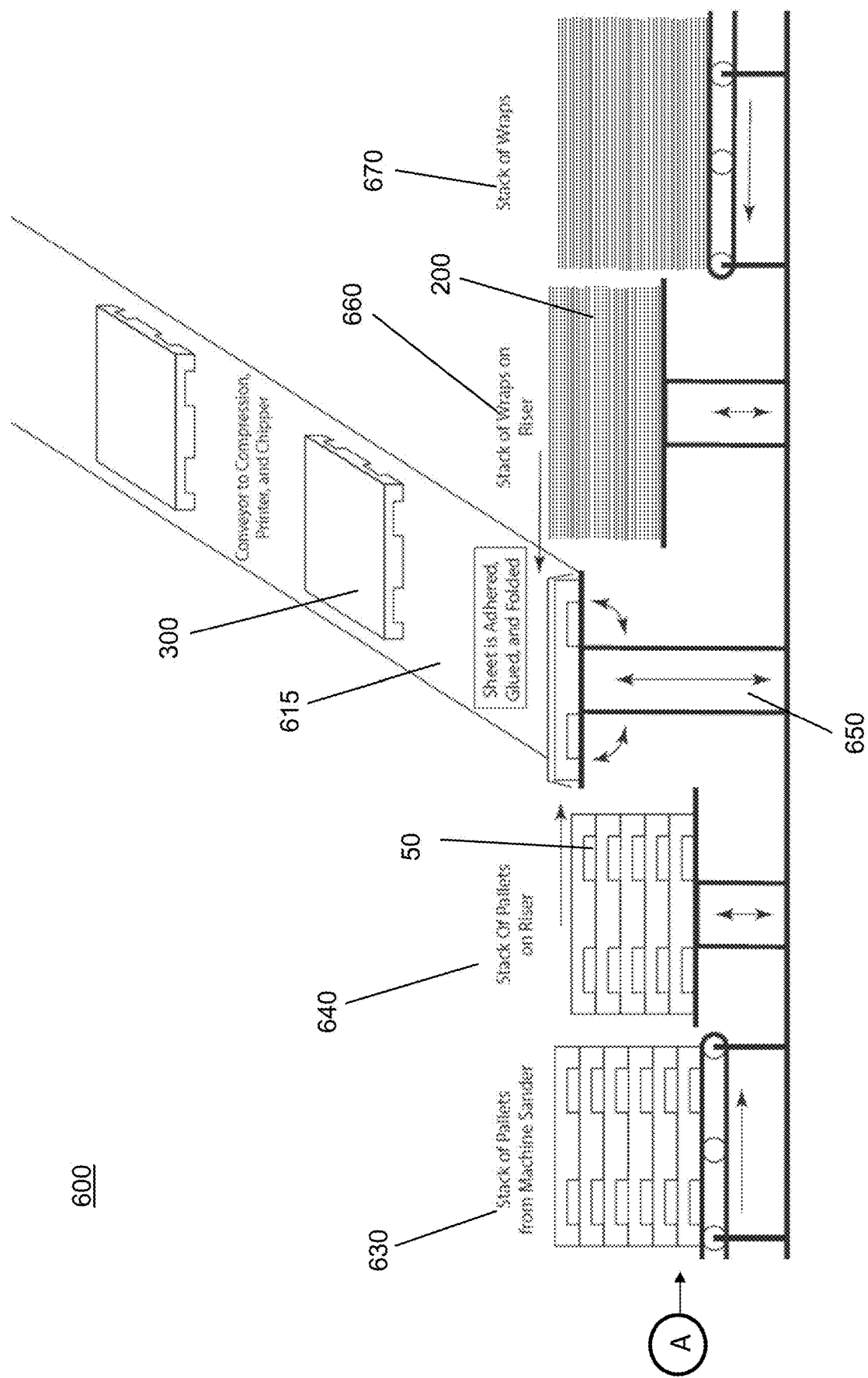

PALLET REPAIR SYSTEM AND METHODS FOR MANUFACTURE

CROSS REFERENCE TO RELATED APPLICATIONS

This application is a continuation-in-part U.S. National Application of PCT/US2020/027110 filed Apr. 7, 2020, which claims the benefit of U.S. Provisional Application No. 62/830,514 filed Apr. 7, 2019.

FIELD OF THE INVENTION

The present invention relates to generally to pallets, and more specifically to a repair system and methods to repair a pallet. The present invention provides a system and method for repairing a pallet using a wrap component configured to surround or cover a portion of a pallet. The wrap component may be manufactured using recycled material, such as paper, aluminum, or plastic, and may further include a chemical for properties such as elasticity, adhesion, and bonding grip.

BACKGROUND OF THE INVENTION

In many industries, pallets are used to protect and support contents during storage and shipment. Goods positioned on pallets are typically moved and stored in warehouses, factories, or vehicles, and are typically transported by forklift equipment. Specifically, forklift tines are inserted into channels in the pallet or by way of engagement with an undersurface of a top deck of the pallet.

Wood pallets have been in use for a number of years, but they tend to have a short service life. Wood pallets degrade or deteriorate from repeated use, i.e., a pallet may not support a load weight that it could support at the beginning of its service life. In addition to repeated use, wood pallets may be affected by weather. Exposure to snow or ice degrades the wood and hardware used to connect wood portions together. Or exposure to rain may cause mold. And in hot weather conditions, the wood can severely dry out causing the pallet to twist, crack, warp, and which further may compromise the joints connected via hardware. All of the aforementioned may impede the strength (defined by maximum load weight) of the pallet.

There is a need to repair wood pallets to extend the service life of wood pallets. The invention satisfies this need.

SUMMARY OF THE INVENTION

The invention provides a pallet wrap system and manufacture for repair of wood pallets. Extending the service life of wood pallets reduces associated costs, environmental concerns, and workplace injuries. To determine whether or not wood pallets need repair, the pallet may be visually inspected or a radar inspection system can be used.

The invention is directed to a pallet assembly comprising a pallet and a wrap component. The wrap component is fabricated from objects made from recyclable material—plastic water bottles, newspapers, aluminum cans—and is used to wrap a pallet and extend its service life. The wrap component is manufactured from recyclable material using a system with a washer component, a shredder component, a melting component, and an extruder component. The wrap or wrap component comprises a plurality of portions hingedly attached to one another and configured to surround or cover a portion of a pallet. The wrap component can be further folded such that it can be erected from a flattened state to form a display unit for products. The wrap may include printed information content such as advertising/marketing content.

A wrap or wrap component can be used to repair wood pallets that have been in use for a number of years. The wrap component prevents or minimizes degradation or deterioration to wood pallets so that they can be used longer. And support a maximum load weight that is the same or similar at both the beginning and end of the pallet's service life. The wrap component according to the invention protects the pallet from the elements of weather—snow, ice, rain. The wrap component wraps the pallet to maintain the wood portions in position and prevent damage, e.g., dried out wood, warping. The wrap component maintains the strength (defined by maximum load weight) of the pallet.

The wrap component is fabricated from objects made of recyclable materials. It is also contemplated that the wrap component may be fabricated with one or more chemicals that provides additional properties such as elasticity, adhesion or bonding grip.

With recycling, waste materials are converted into reusable objects. This is advantageous to prevent waste of potentially useful materials, as well as to reduce the consumption of fresh raw materials, energy usage, air pollution (from incineration) and water pollution (from landfilling) by decreasing the need for "conventional" waste disposal and lowering greenhouse gas emissions.

The invention is directed to a pallet assembly for receiving product, comprising one or more base components forming a platform, two or more support components positioned on an underside of the platform, and a wrap component attached to the platform and configured to cover at least a portion of the two or more support components. The wrap component is formed of a recyclable material and is attached to the platform using a fastener element such as adhesive or hardware such as screws, nails, staples.

According to the invention, a system and methods for fabricating a wrap component comprises a washer component, a shredder component, a melting component, and an extruder component. A washer component washes an object comprising recyclable material. A shredder component grinds the recyclable material. A melting component liquefies the recyclable material into a molten material and an extruder component extrudes the molten material into the wrap component.

A fastener element—adhesive or hardware such as screws, nails, staples—connects one or more wrap components to the pallet. An example of an adhesive is an industrial strength glue that may be sprayed on the pallet. Either hot glue or cold glue techniques are contemplated. In addition to connecting portions of the pallet, a fastener element such as nails or screws may be used to connect the wrap component to the pallet.

The invention and its attributes and advantages may be further understood and appreciated with reference to the detailed description below of one contemplated embodiment, taken in conjunction with the accompanying drawings.

A further advantage of the invention is that it provides a tracking functionality to one or more pallets, for example, through the coordinated use of bar codes, hologram, RFID tags, or GPS systems (tracking devices) the pallet can be located. A bar code is a series of lines of that can be read by a computer input device, for example, a bar code scanner and provide a wide variety of information. A hologram is a three-dimensional photograph or illustration, created with an optical process that uses lasers. Holograms are difficult to replicate or counterfeit. A RFID tag, or radio frequency identification tag, is a type of electronic identification that uses radio frequency signals to read information. A Global Positioning System (GPS) is a satellite-based navigation system. A tracking device may be applied to each component, larger groupings of components, or the fully assembled pallet. The tracking device can communicate a variety of information, for example, certification of the maximum weight the pallet is capable of supporting, origin, and destination of the product associated with a particular pallet along with the location at any given moment in time. It is further contemplated that the tracking device may include other sorts of information such as a customer's logo. The components of the pallet may additionally have designations by which the pallet components may be identified and tracked. Components suitable for reuse may include designations or identifications that assist one or more subsequent purchasers of the use history of that component. A corporate certification stamp backed by insurance, such as is used in the corrugated box industry, can be used to designate manufacturing guarantees such as product transport or storage warranties. In fact, one or more components of the pallet may be certified, such as in printed information including the manufacturer's or shipper's information, identification or logo to make sure that only that business' product is shipped or used with the identified pallet. This is important when quality control certification only applies when the business' given product is carried on the identified pallet. Other features will become apparent in the following description.

According to the invention, a chip inserter device positions a tracking device or tracking element such as an identification (ID) chip on the pallet assembly. The ID chip, such as an RFID tag, may be used to track the pallet assembly. A RFID tag, or radio frequency identification tag, is a type of electronic identification that uses radio frequency signals to read information. A tracking device may be applied to each component, larger groupings of components, or the fully assembled pallet. The tracking device can communicate a variety of information, for example, certification of the maximum weight the pallet is capable of supporting, origin, and destination of the product associated with a particular pallet along with the location at any given moment in time. It is also contemplated that the ID chip may include data read by a printer device. This data may identify the content to be selected from a database and printed on the pallet assembly.

The invention and its attributes and advantages may be further understood and appreciated with reference to the detailed description below of one contemplated embodiment, taken in conjunction with the accompanying drawings.

BRIEF DESCRIPTION OF THE DRAWINGS

The preferred embodiments of the invention will be described in conjunction with the appended drawings provided to illustrate and not to the limit the invention, where like designations denoted like elements, and in which:

FIG. 9B illustrates a block diagram of a system for assembling a pallet and wrap component according to the invention.

DETAILED DESCRIPTION OF THE PREFERRED EMBODIMENTS

Figure 1A:
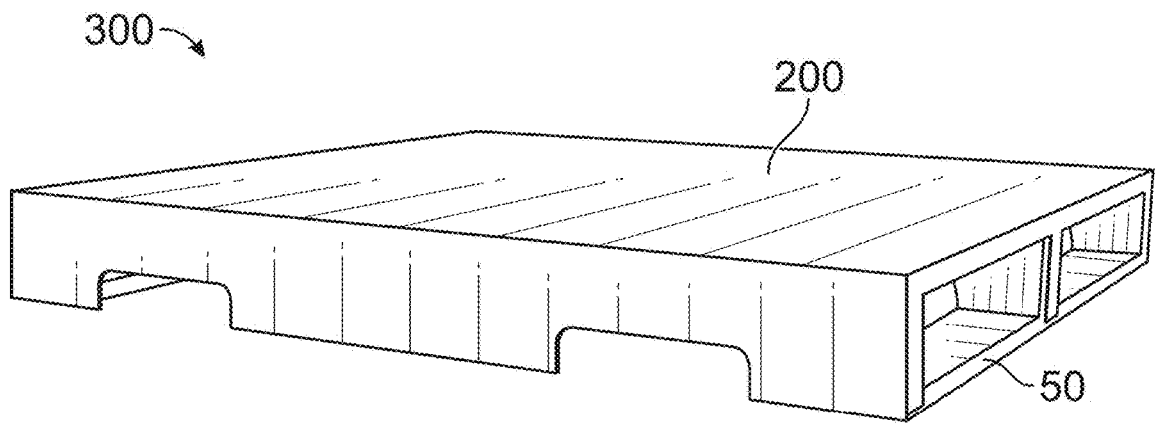
FIG. 1A illustrates a perspective view of an assembly including a pallet and a wrap component according to an embodiment of the invention.

FIG. 1A illustrates a perspective view of an assembly 300 including a pallet 50 and a wrap component 200 according to an embodiment of the invention. In this embodiment, the wrap component 200 covers the entire top platform and all or a portion of one or more side surfaces of the pallet 50. As shown, the wrap component 200 covers the entire top platform and a portion of our side surfaces of the pallet 50.

Figure 1B:
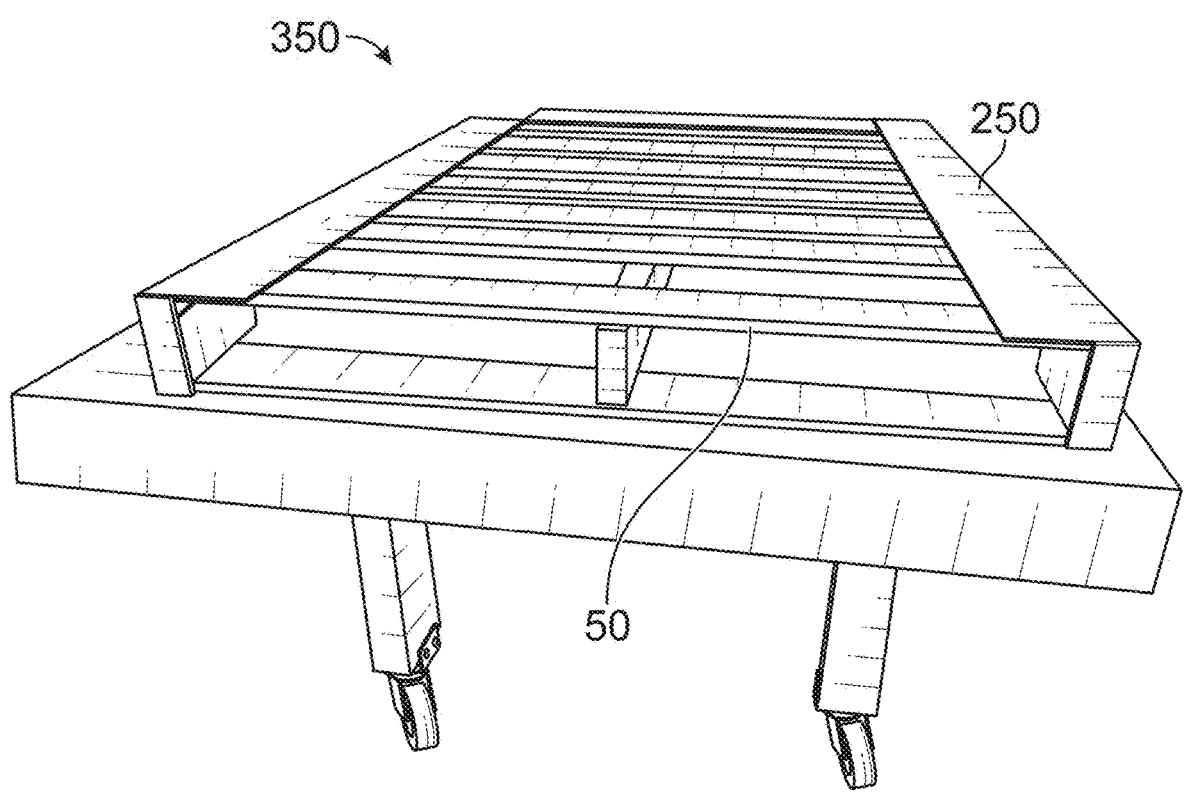
FIG. 1B illustrates a perspective view of an assembly including a pallet and a wrap component according to another embodiment of the invention.

FIG. 1B illustrates a perspective view of an assembly 350 including a pallet 50 and a wrap component 250 according to another embodiment of the invention. In this embodiment, the wrap component 250 comprises two pieces with each piece being generally L-shaped configuration that covers a portion of the top platform and all or a portion of one or more side surface of the pallet 50. As shown, each piece of the wrap component 250 covers a portion of the top platform and a portion of three side surfaces of the pallet 50.

It is further contemplated that either wrap 200, 250 component may cover all or a portion of a bottom surface.

Figure 2:
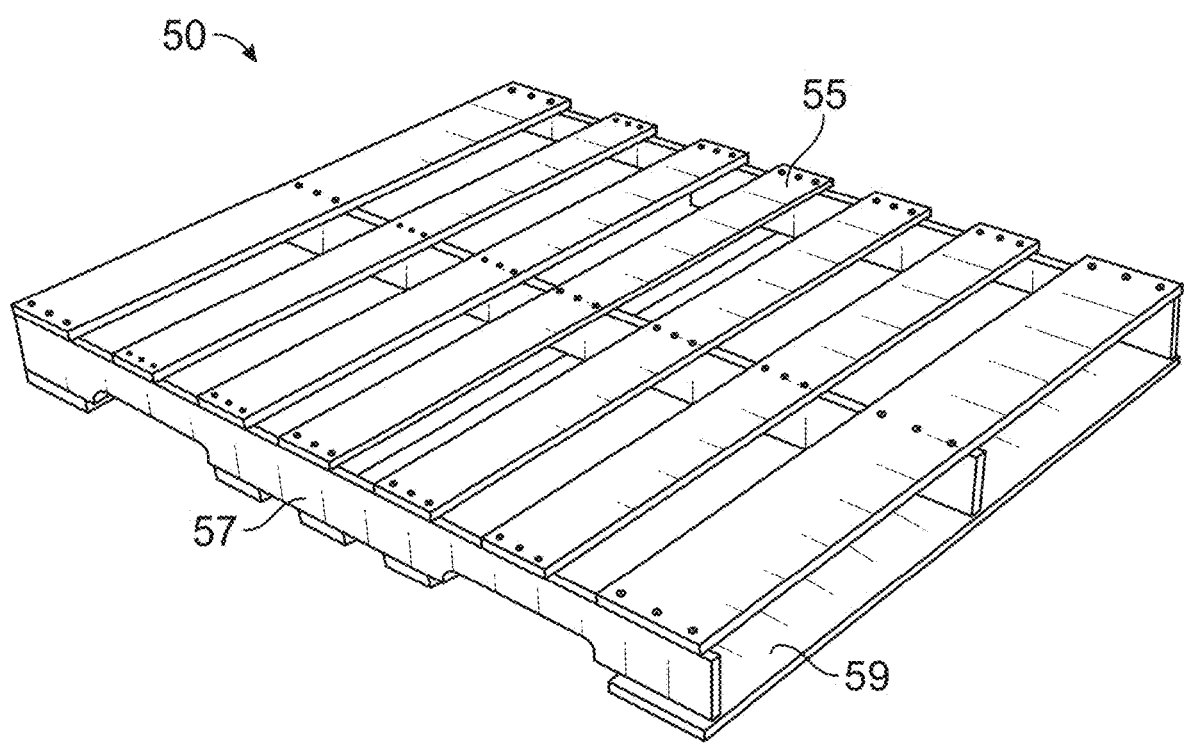
FIG. 2 illustrates a perspective view of a traditional wood pallet.

FIG. 2 illustrates a perspective view of a traditional wood pallet 50. Pallet 50 includes a top platform 55 and a bottom platform 59. Each of the platforms 55, 59 may be constructed from a continuous flat sheet of material or from a plurality of board elements. Support components 57 are shown in FIG. 2 as three beams and are positioned between the top platform 55 and the bottom platform 59. The exterior two support components form the side surfaces of the pallet 50. The support components 57 are positioned to form openings, or point of entry, for machinery, e.g., so that a forklift truck or hand jack can be used to move and position the pallet 50.

Figure 3A:
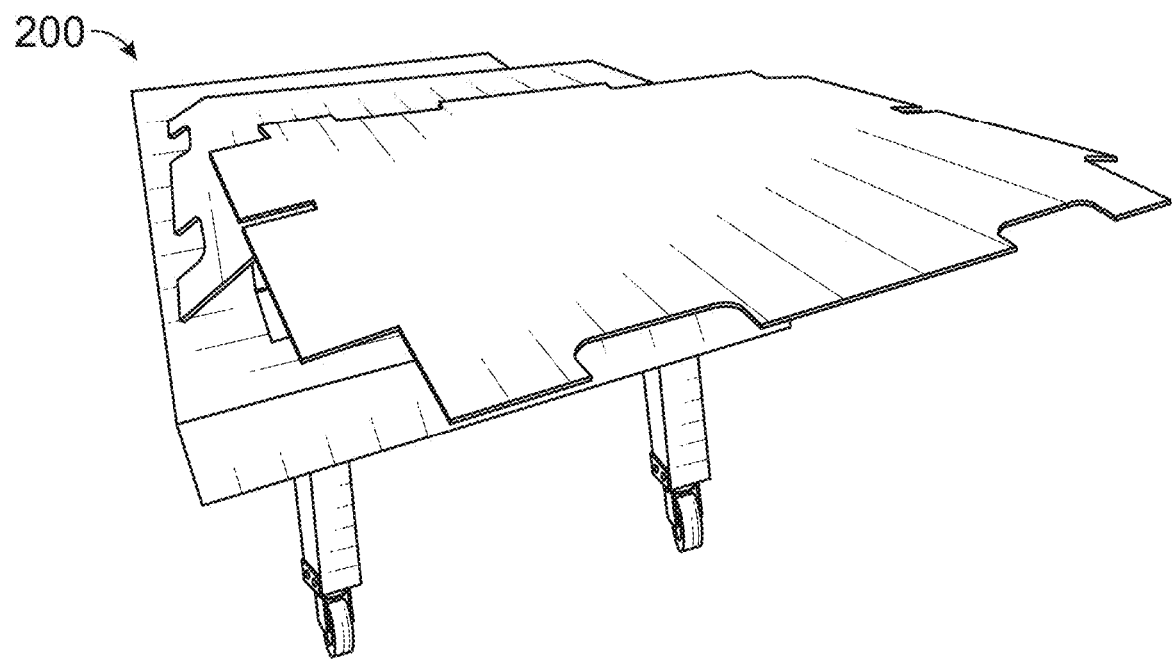
FIG. 3A illustrates a wrap component according to an embodiment of the invention.
Figure 3B:
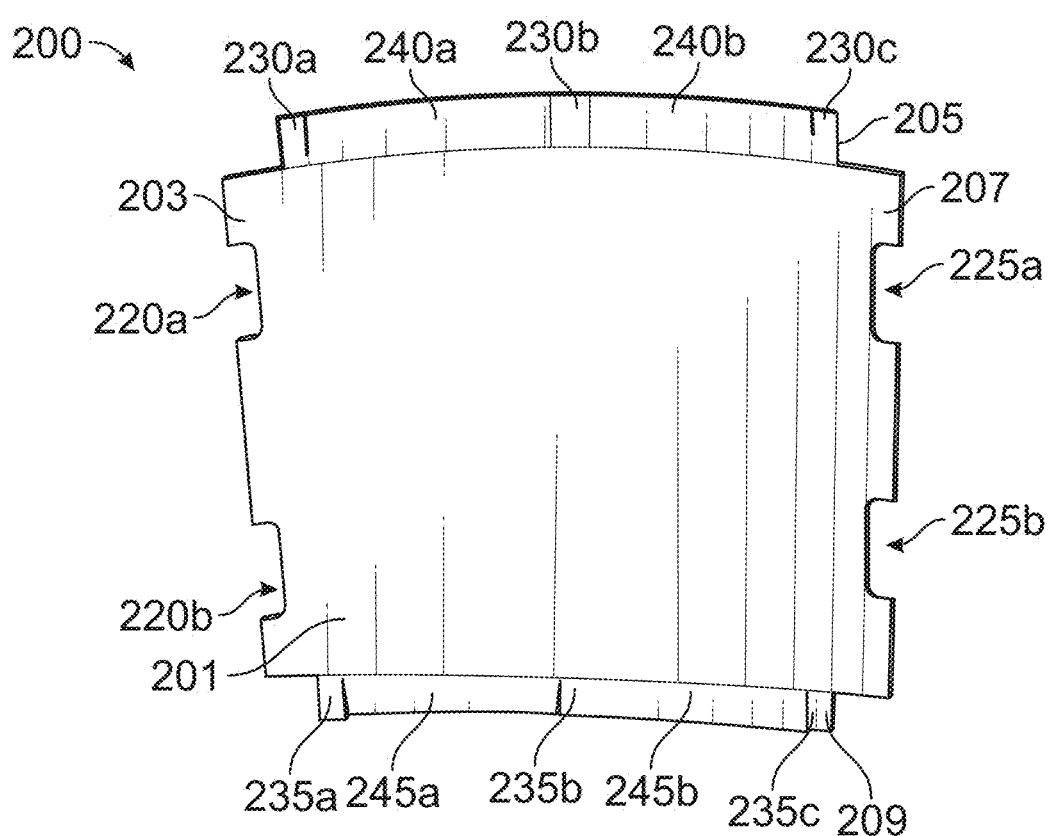
FIG. 3B illustrates a wrap component according to another embodiment of the invention.

FIG. 3A and FIG. 3B illustrate a wrap component 200 according to an embodiment of the invention. The wrap component 200 includes a base element 201 configured to cover the entire top platform of a pallet 50 (see FIG. 1A). Four side support elements 203, 205, 207, 209 are hingedly attached to the base element 201 and foldable so that they are configured to cover the side surfaces of the pallet. Each side support elements 203, 207 each include cutout portions—side support element 203 includes cutout portions 220a, 226b and side support element 207 includes cutout portions 225a, 225b—keep clear a point of entry for machinery used to maneuver the pallet 50.

Each side support elements 205, 209 each include a plurality of slits that form a plurality of tab components and flap components—side support element 205 includes tab components 230a, 230b, 230c and flap components 240a, 240b, and side support element 209 includes tab components 235a, 235b, 235c and flap components 245a, 245b. The tab components are configured to cover ends of support components 57 of a pallet 50. The flap components are designed to adhere to the underside of the top platform 55 to keep clear a point of entry for machinery used to maneuver the pallet 50.

Figure 4A:
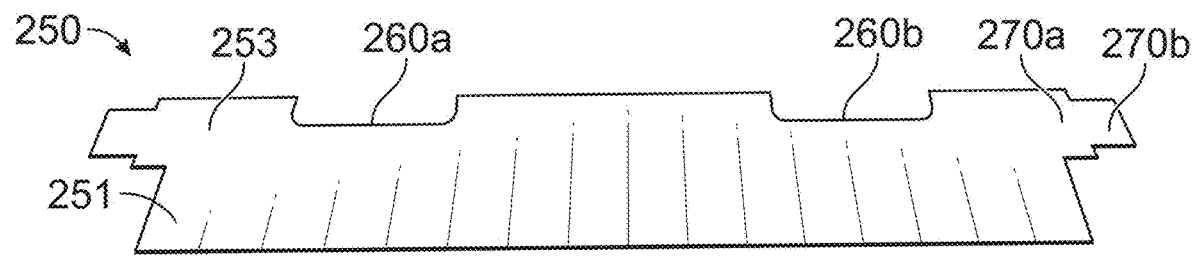
FIG. 4A illustrates a wrap component according to an embodiment of the invention.
Figure 4B:
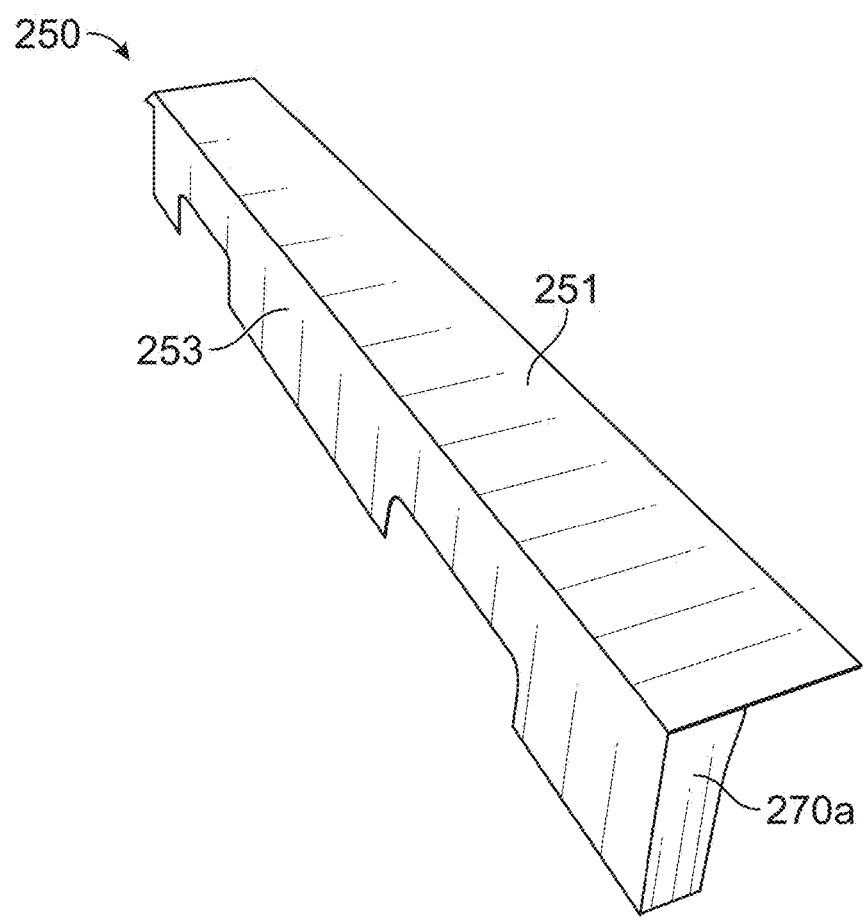
FIG. 4B illustrates a wrap component according to another embodiment of the invention.

FIG. 4A and FIG. 4B illustrate a wrap component 250 according to another embodiment of the invention. As shown, each piece of the wrap component 250 covers a portion of the top platform and a portion of three side surfaces of the pallet 50. The wrap component 250 includes a first base element 251 and a side support element 253 that are hingedly attached to one another and configured to be folded into a L-shaped configuration such that the first base element 251 covers a portion of the top platform and the second base element covers 253 all or a portion of a side surface of the pallet 50. The second base element 253 also includes a tab component 270a and flap component 270B. The tab component 270a is configured to cover ends of support components 57 of a pallet 50, while flap component 270b is configured to adhere to the inside surface of an exterior support component of the pallet 50.

Figure 5A:
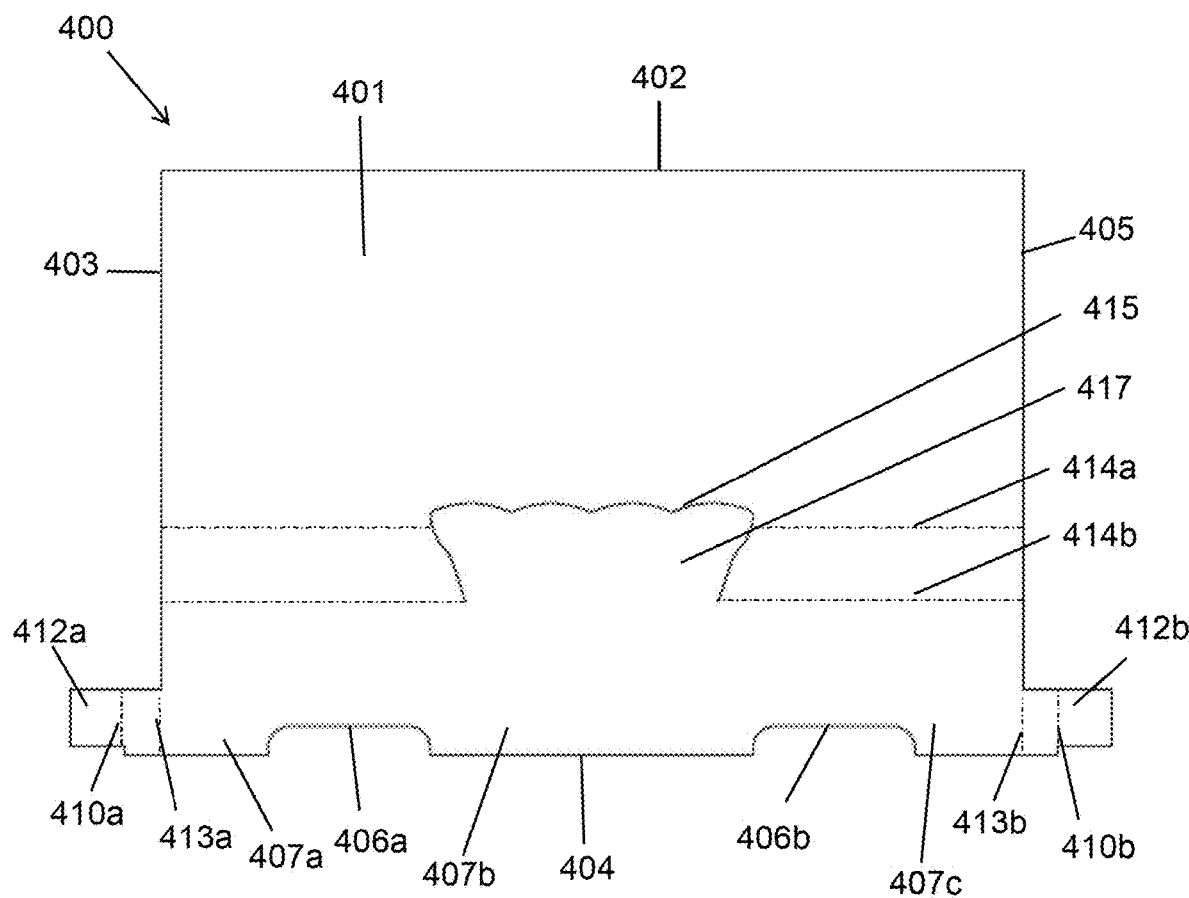
FIG. 5A illustrates a wrap component according to an embodiment of the invention.

FIG. 5A illustrates a wrap component 400 according to another embodiment of the invention. The wrap component 400 includes a first base element 401 comprising a first edge 402, second edge 403, third edge 404 and fourth edge 405. The fourth edge 405 includes cutout portions 406a, 406b that form tab components 407a, 407b, 407c.

Two side flaps 410a, 410b are hingedly attached to the first base element 401 and include score lines 412a, 413a and 412b, 413b, respectively. Base element 401 includes parallel score lines 414a, 414b interrupted by slit element 415. Slit element 415 can be any size, shape, configuration. As show, slit element 415 is "scalloped". Once folded along score lines 414a, 414b, slit element 415 forms a cut-out panel 417 of the first base element 401.

Figure 5B:
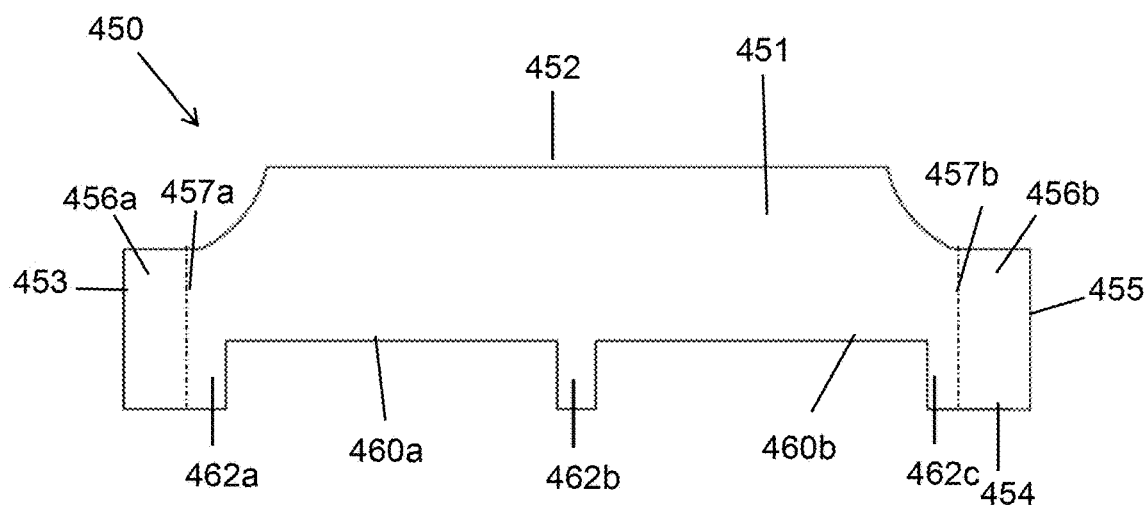
FIG. 5B illustrates a wrap component according to another embodiment of the invention.

FIG. 5B illustrates a wrap component 450 according to another embodiment of the invention. The wrap component 450 includes a second base element 451 comprising a first border 452, second border 453, third border 454 and fourth border 455. A first flap component 456a and a second flap component 456b are defined by score lines 457a, 457b, respectively. The third border 454 includes cutout portions 460a, 460b that form tab components 462a, 462b, 462c.

Figure 6A:
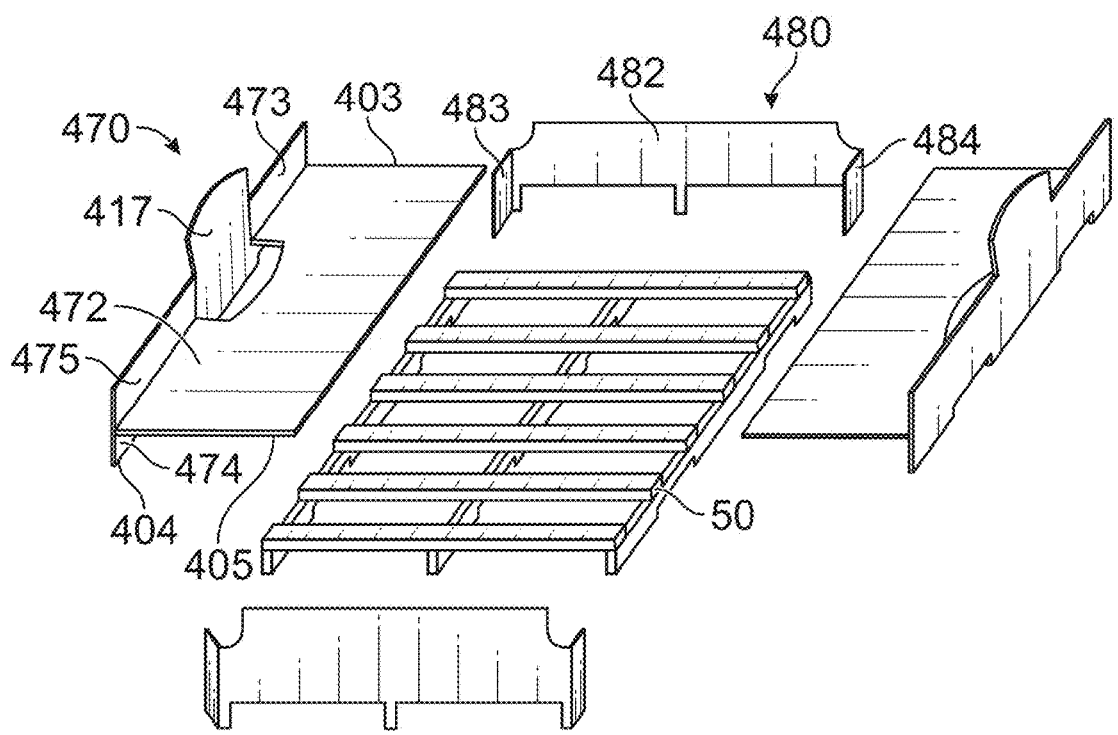
FIG. 6A illustrates an exploded view of a pallet assembly including wrap components that erect into a display unit according to an embodiment of the invention.
Figure 6B:
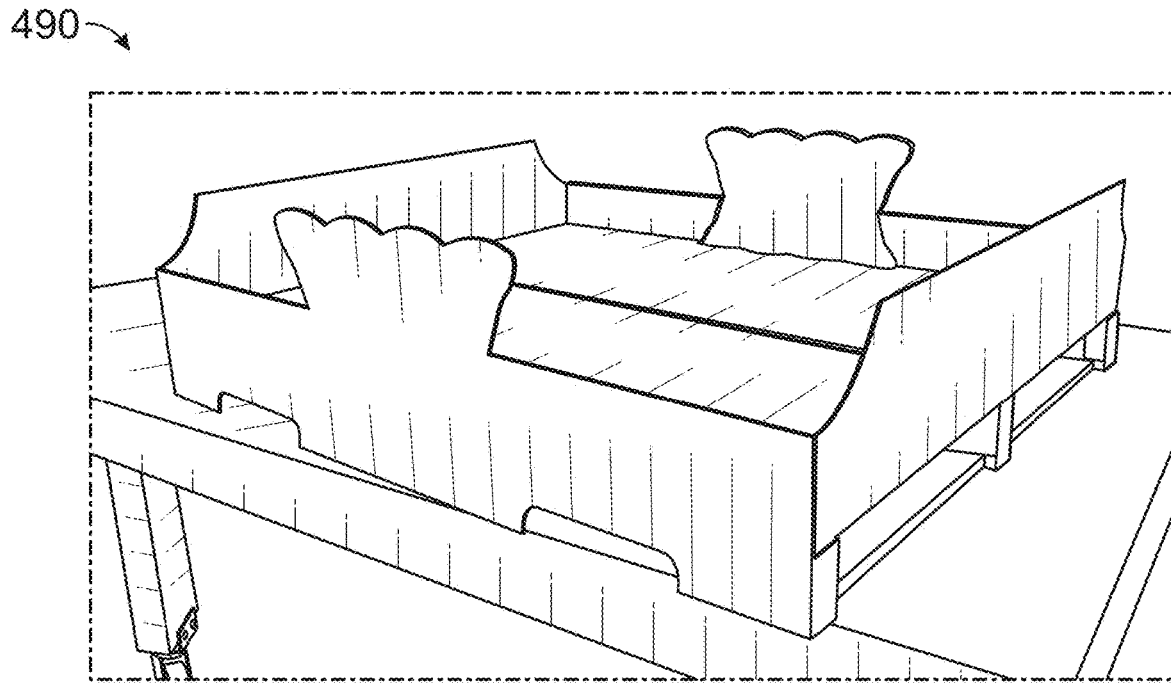
FIG. 6B illustrates a pallet assembly including wrap components that erect into a display unit according to an embodiment of the invention.

According to the embodiment of the invention shown in FIGS. 6A and 6B, two wrap components 400 as shown in FIG. 5A and two wrap components 450 as shown in FIG. 5B are used in combination to wrap or cover a pallet 50. For discussion purposes, assembly of one of each wrap component 400, 452 is described.

FIG. 6A illustrates an exploded view of a pallet assembly and FIG. 6B illustrates a pallet assembly including wrap components erected into a display unit according to an embodiment of the invention.

The first base element 401 of wrap component 400 is positioned on the top surface of the pallet 50 such that second edge 403 and fourth edge 405 align with the top edges of the side surfaces of the pallet 50. The third edge 404 aligns with the bottom edge of a side surface of the pallet 50 with the tab components 407a, 407b, 407c covering portions of the side surface of the pallet 50 and cutout portions 406a, 406b aligning with openings in the pallet 50 proving a clear point of entry into the pallet 50 for machinery such as forklift tines used to maneuver the pallet 50.

As shown in FIG. 6A, first base element 401 is folded about score lines 414a, 414b to form top panel 472, side panel 473 and back panel 474. Top panel 472 is positioned on the top surface of the pallet 50 so that first edge 402 is located in the approximate middle of the pallet 50. Side panel 473 and back panel 474 are folded about one another forming a double layer panel 475 and positioned along a side surface of the pallet 50.

Each side flap 410a, 410b is folded about score lines 412a, 413a and 412b, 413b, respectively, (not shown) to rest along surfaces of the pallet. Folding the first base element 401 about score lines 414a, 414b erects the cut-out panel 417 formed by slit element 415. Both panel 475 and cut-out panel 417 each extend above and are perpendicular to the top panel 472 of wrap component 400.

The second base element 451 of wrap component 450 is positioned on the side surface of the pallet 50. When folded about score lines 457a, 457b, three panels are formed 482, 483, 484. Panel 482 is positioned along a side surface of the pallet. Panels 483, 484 are perpendicular to panel 482 and positioned along other side surfaces of the pallet 50.

The third border 454 aligns with the bottom edge of a side surface of the pallet with the tab components 462a, 462b, 462c covering portions of the side surface of the pallet 50 and cutout portions 460a, 460b aligning with openings in the pallet 50 proving a clear point of entry into the pallet for machinery such as forklift tines used to maneuver the pallet 50. Panel 482 extends above and is perpendicular to the top panel 472 of wrap component 400.

In a preferred embodiment, wrap components 450 are positioned on the pallet before the wrap components 400 such that side flap 410a, 410b are folded over tab components 462a, 462c, respectively. It is contemplated also that adhesive may be used to adhere any portion of the wrap component 400, 450 to each other or to the pallet.

Figure 7A:
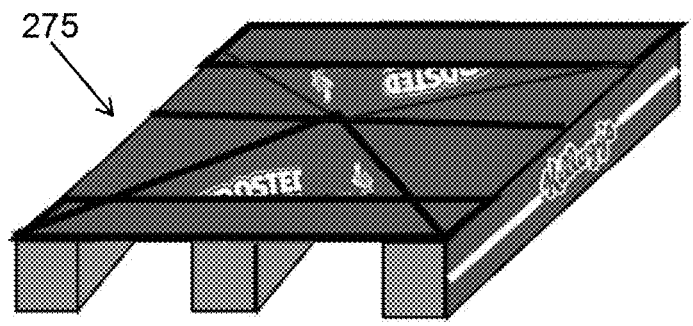
FIG. 7A illustrates a pallet assembly including wrap component that erects into a display unit according to an embodiment of the invention.
Figure 7B:
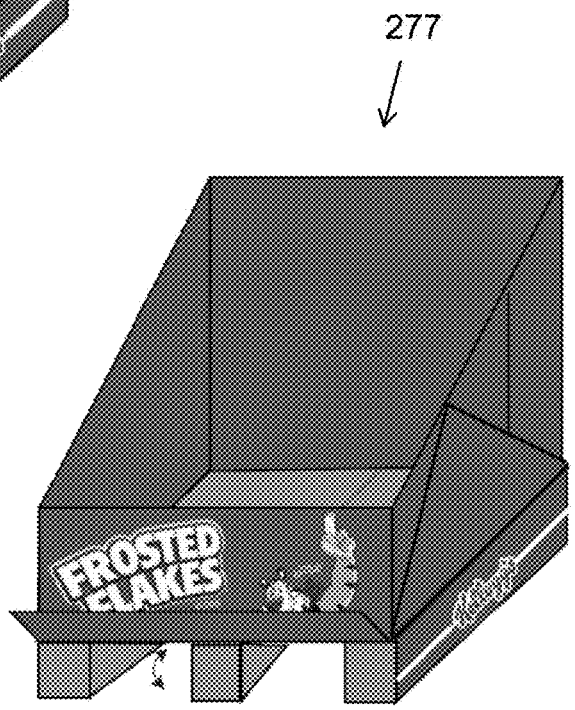
FIG. 7B illustrates a pallet assembly including wrap component that erects into a display unit according to an embodiment of the invention.
Figure 7C:
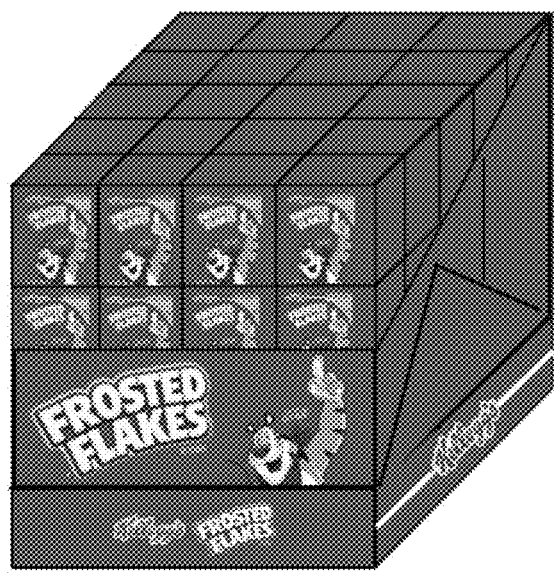
FIG. 7C illustrates a pallet assembly including wrap component that erects into a display unit according to an embodiment of the invention.

FIG. 7A, FIG. 7B, FIG. 7C illustrate a pallet assembly including wrap component that erects into a display unit according to an embodiment of the invention. As shown by element 275 in FIG. 7A, the wrap component formed of a recyclable material comprises a plurality of portions hingedly attached to one another, and is attached to the platform of the pallet. The wrap component is configured to cover the platform and at least a portion of the two or more support components. The wrap component is unfolded from a flattened state and erected to form a display unit as shown by 277 in FIG. 7B. The wrap may include printed information content such as advertising/marketing content, manufacturer's or shipper's information, identification or logo to make sure that only that business' product is shipped or used with the identified pallet. As shown by 278 in FIG. 5C, the display unit may be erected to form a container that holds products.

Figure 8:
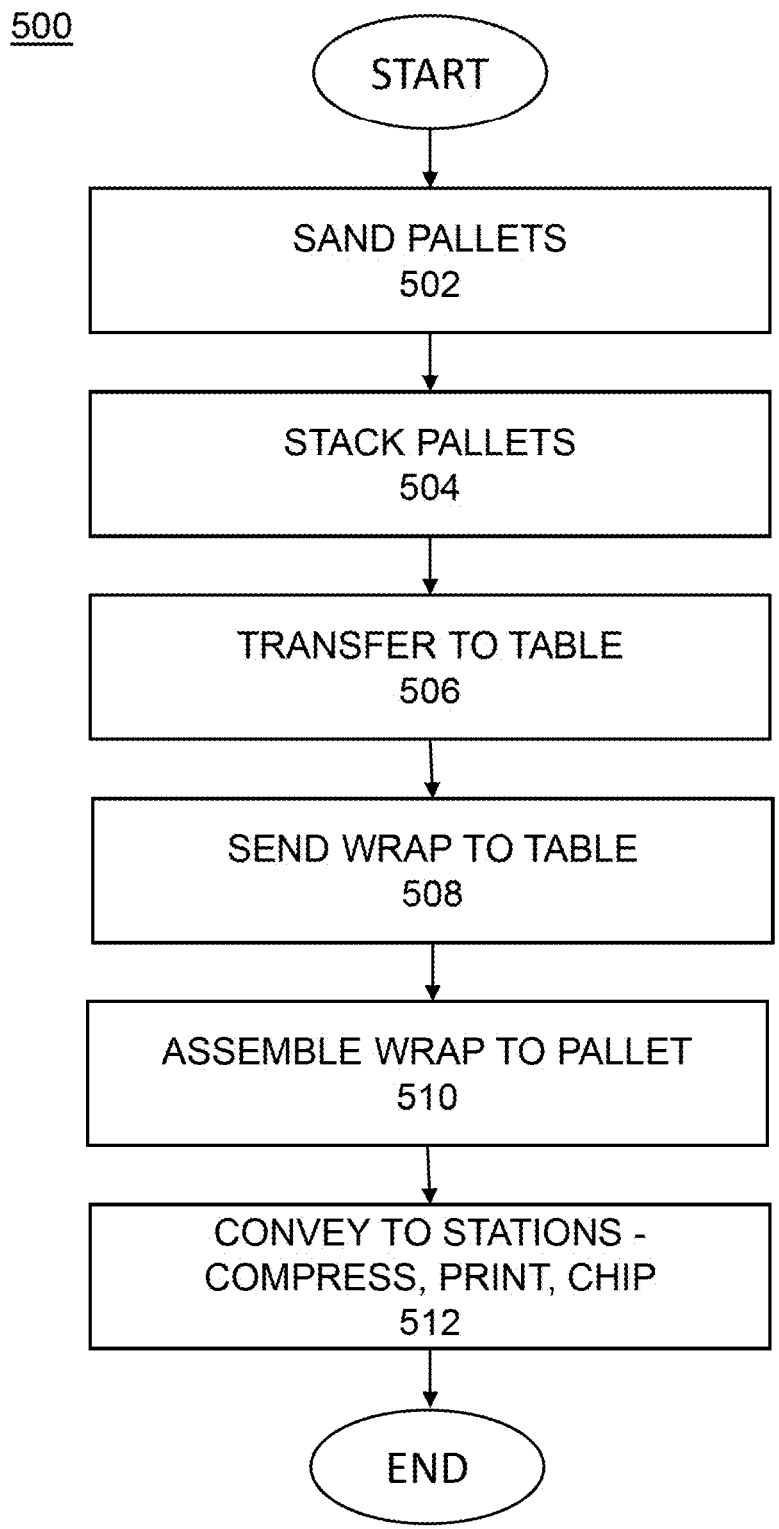
FIG. 8 illustrates a flow chart of a method for assembling a pallet and wrap component according to the invention.

FIG. 8 illustrates a flow chart of a method 500 for assembling a pallet and wrap component according to the invention. At step 502, pallets are received and sanded to remove loose debris and remove any imperfections that could affect assembly with the wrap component. At step 504, the sanded pallets are stacked upon one another. One pallet is selected from the stack and transferred to a table at step 506. At step 508, a wrap component is selected and sent to the table. The wrap component is assembled to the pallet at step 510. The assembled pallet is then conveyed at step 512 to one or more stations. These stations may include a compression station that compress the assembly to ensure the wrap is secured to the pallet, a printer station that prints content on the wrap component such as advertising/marketing content, and/or a chip station including a chip inserter device that positions a tracking device or tracking element such as an identification (ID) chip on the pallet assembly.

Figure 9A:
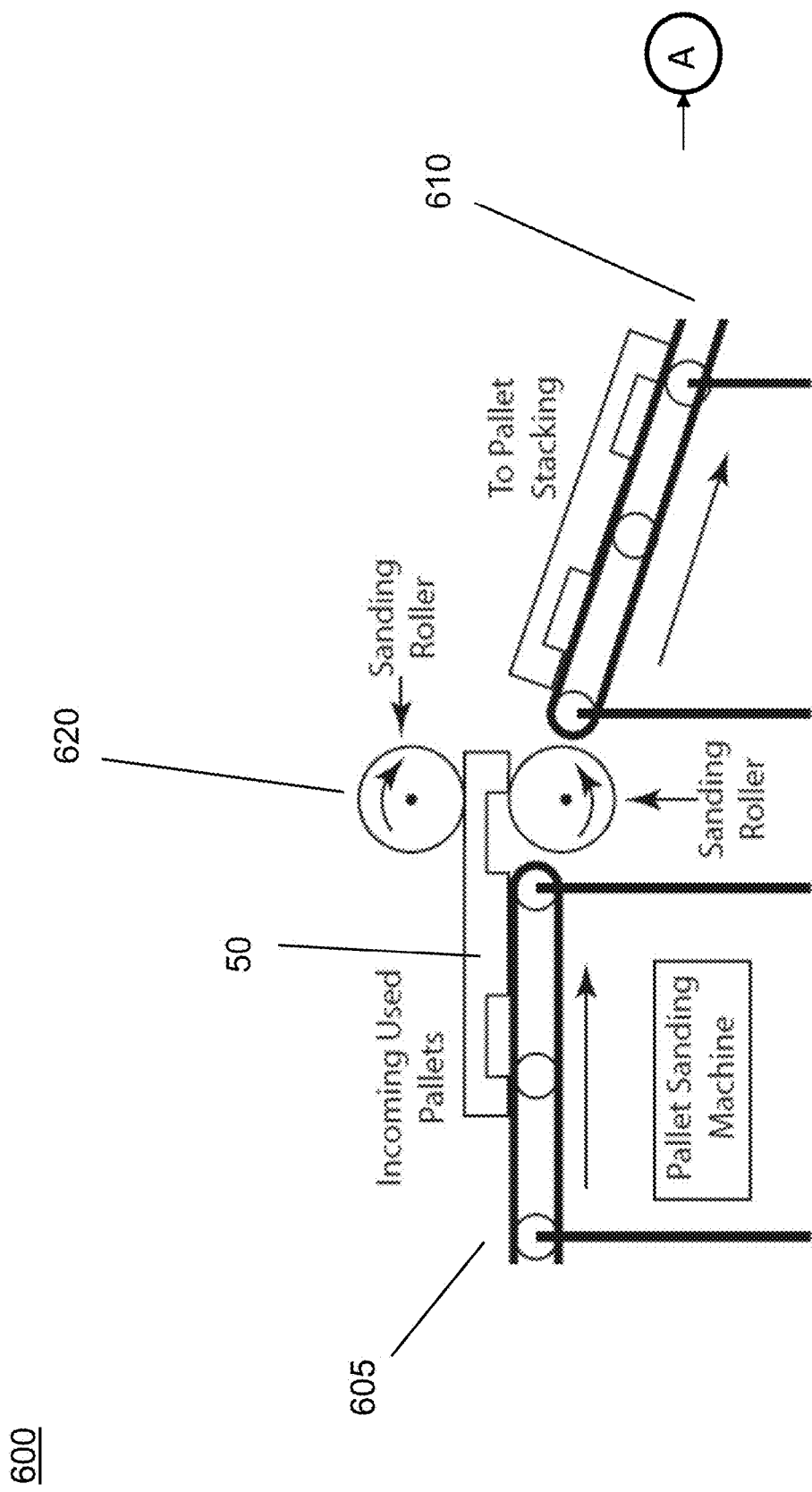
FIG. 9A illustrates a block diagram of a system for assembling a pallet and wrap component according to the invention.

FIG. 9A and FIG. 9B illustrates a block diagram of a system 600 for assembling a pallet and wrap component according to the invention. The system 600 includes a conveyor 605 that receives and transports a used pallet 50 to a sanding device 620. For example, the sanding device 620 may comprises a plurality of sanded rollers that rotate to and the surfaces of the pallet as it moves to a conveyor 610 that supplies the sanded pallet to a stacking stand with conveyor 630. The stacking stand 630 includes a stack of pallets that are conveyed to a riser device 640 that moves in the vertical direction. The riser device 640 deposits the pallet 50 to an assembly table 650. It is contemplated that the assembly table 650 can rotate 360 degrees, move in the vertical direction as well as swivel on an angle to allow for different shapes and sized pallets and wraps.

The system 600 includes another stacking stand with conveyor 670 that includes a stack of wraps. The stack of wraps are conveyed to a riser device 660 that moves in the vertical direction. The riser device 640 deposits the wrap 200 to the assembly table 650. The pallet 50 is positioned on a table 650 and the wrap component 200 is connected to the pallet using adhesive or hardware. The assembled pallet is then conveyed to one or more stations: a compression station that compress the assembly to ensure the wrap is secured to the pallet, a printer station that prints content on the wrap component such as advertising/marketing content, and/or a chip station including a chip inserter device that positions a tracking device or tracking element such as an identification (ID) chip on the pallet assembly.

Figure 10:
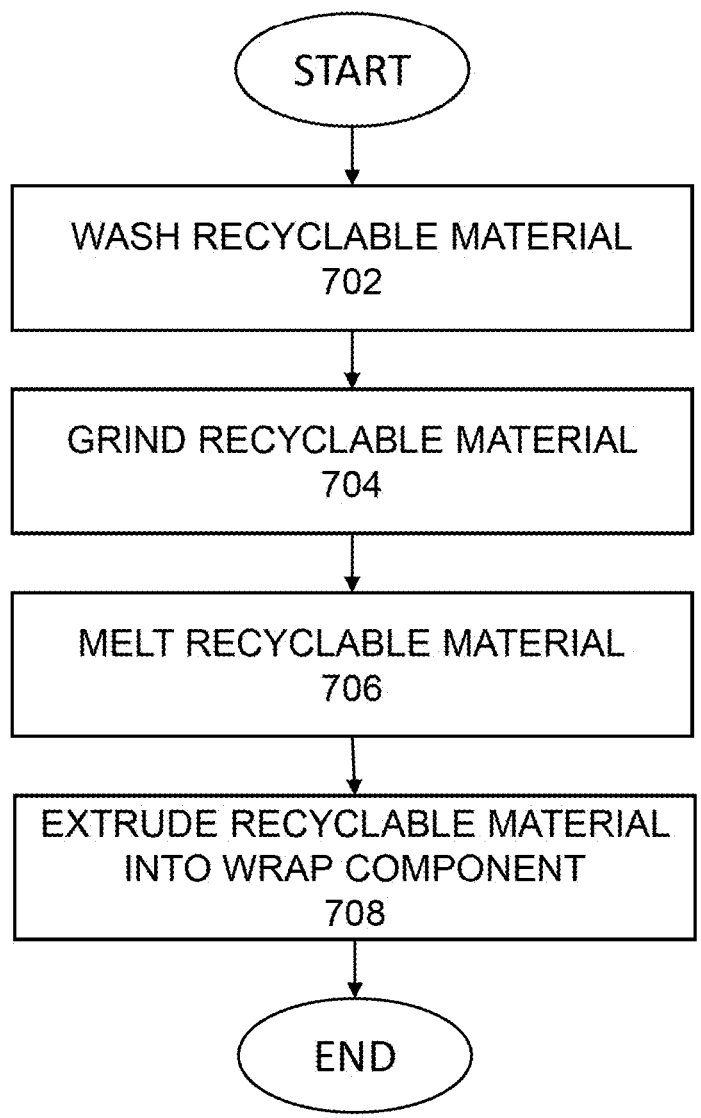
FIG. 10 illustrates a flow chart of a method for manufacturing a wrap component according to the invention.

FIG. 10 illustrates a flow chart of a method 700 for manufacturing a wrap component of a pallet assembly according to an embodiment of the invention. At step 702, an object comprising recyclable material is washed by the washer component. At step 704, the recyclable material is grinded by the shredder component. At step 706, the grinded recyclable material is melted or liquefied by the melting component. At step 708, the molten material is extruded into a wrap component by the extruder component. The wrap component may be allowed to cool before being stacked for use.

Figure 11:
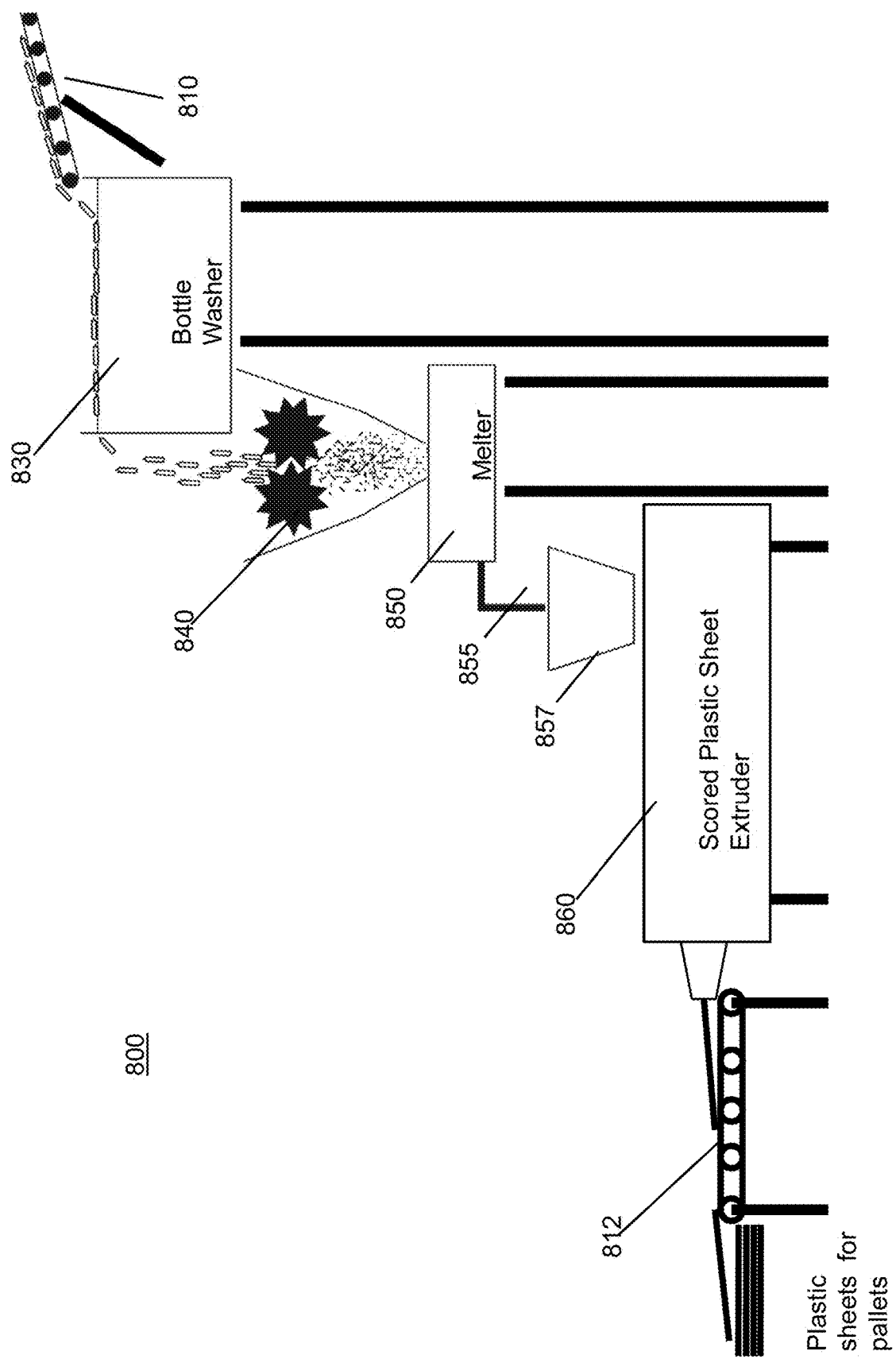
FIG. 11 illustrates a block diagram of a system for manufacturing a wrap component according to the invention.

FIG. 11 illustrates a block diagram of a system 800 for manufacturing a wrap component of a pallet assembly according to an embodiment of the invention. The system 800 includes a washer component 830, a shredder component 840, a melting component 850, and an extruder component 860. A first conveyer 810 provides an object to the washer component 830. The washer component expels the washed object directly into the melting component 850. A conduit 855 carries molten material to an inlet container 857 that releases the molten material into the extruder component 860. The extruder component 860 extrudes the molten material to form a wrap component (see FIG. 3A, FIG. 4A). A second conveyor 812 transports the wrap component for assembly to a pallet such as by the system described above in FIG. 9A and FIG. 9B. It is also contemplated that the wrap component may be cooled on the second conveyor 812 before being used.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

The invention claimed is:

1. A pallet assembly comprising a pallet including a top platform and two or more side surfaces formed by support components positioned on an underside of the platform, the pallet assembly for receiving product, comprising:
   a wrap component comprising a continuous sheet of material and attached to the platform of the pallet and configured to cover the entire top platform and the two or more side surfaces formed by the support components, and
   a fastener element such as an adhesive or a hardware, wherein the wrap component is attached to the platform using the fastener element.

2. The pallet assembly according to claim 1 wherein the wrap component is formed of a recyclable material.

3. The pallet assembly according to claim 2, further comprising a system for fabricating a wrap component, the system comprising:
   a washer component configured to receive an object comprising recyclable material;
   a shredder component configured to grind the recyclable material;
   a melting component configured to liquefy the recyclable material into a molten material; and
   an extruder component configured to extrude the molten material into the shape of the wrap component.

4. The pallet assembly according to claim 1 wherein the wrap component is formed of a recyclable material.

5. The pallet assembly according to claim 4, further comprising a system for fabricating a wrap component, the system comprising:
   a washer component configured to receive an object comprising recyclable material;
   a shredder component configured to grind the recyclable material;
   a melting component configured to liquefy the recyclable material into a molten material; and
   an extruder component configured to extrude the molten material into the shape of the wrap component.

6. A pallet assembly comprising a pallet including a top platform and side surfaces formed by support components positioned on an underside of the platform, the pallet assembly for receiving product, comprising:
a wrap component attached to the platform and configured to cover the entire top platform and all or a portion of the side surfaces formed by the support components, wherein the wrap component includes a base element and two or more side support elements, each side support element hingedly attached to the base element and foldable to cover the side surfaces of the pallet, wherein at least one of the two or more side support element includes a cutout portion and at least one of the two or more side support element includes a plurality of slits forming one or more tab components and one or more flap components, each tab component configured to cover a portion of the support components, and each flap component configured to cover the underside of the top platform.

7. The pallet assembly according to claim 6 further comprising a fastener element attaching the wrap component to the pallet.

8. The pallet assembly according to claim 7 wherein the fastener element is an adhesive or a hardware.

9. A pallet assembly comprising a pallet including a top platform and surfaces formed by support components positioned on an underside of the platform, the pallet assembly for receiving product, comprising:
a wrap component attached to the platform of the pallet and configured to cover the top platform and the two or more side surfaces formed by the support components, the wrap component comprising two pieces with each piece including a base element hingedly attached to a side support element and configured to be folded into a L-shaped configuration covering a portion of the top platform and all or a portion of one or more side surface of the pallet,
the base element including a tab component and a flap component, each of the tab component and the flap component configured to cover a portion of the support components, and
a fastener element such as an adhesive or a hardware, wherein the wrap component is attached to the platform using the fastener element.

10. The pallet assembly according to claim 9 wherein the fastener element is an adhesive or a hardware.

11. The pallet assembly according to claim 9 wherein the wrap component is formed of a recyclable material.

12. The pallet assembly according to claim 11, further comprising a system for fabricating a wrap component, the system comprising:
a washer component configured to receive an object comprising recyclable material;
a shredder component configured to grind the recyclable material;
a melting component configured to liquefy the recyclable material into a molten material; and
an extruder component configured to extrude the molten material into the shape of the wrap component.

* * * * *